(12) United States Patent
Hirata et al.

(10) Patent No.: US 12,249,887 B2
(45) Date of Patent: Mar. 11, 2025

(54) VIBRATING MOTOR WITH NOTCH IN CASE

(71) Applicant: NIDEC CORPORATION, Kyoto (JP)

(72) Inventors: Atsunori Hirata, Kyoto (JP);
Tomohiro Kobayashi, Kyoto (JP);
Masanobu Takada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 686 days.

(21) Appl. No.: 17/491,531

(22) Filed: Oct. 1, 2021

(65) Prior Publication Data

US 2022/0109359 A1    Apr. 7, 2022

(30) Foreign Application Priority Data

Oct. 2, 2020 (JP) ................................. 2020-167852

(51) Int. Cl.
*H02K 33/18* (2006.01)
*B06B 1/04* (2006.01)
*H02K 33/02* (2006.01)

(52) U.S. Cl.
CPC ............ *H02K 33/18* (2013.01); *H02K 33/02* (2013.01); *B06B 1/045* (2013.01)

(58) Field of Classification Search
CPC ........ H02K 33/16; H02K 33/18; H02K 33/02; H02K 33/04; H02K 33/08; H02K 33/10; B06B 1/045
See application file for complete search history.

(56) References Cited

U.S. PATENT DOCUMENTS

| | | | | |
|---|---|---|---|---|
| 4,363,980 A | * | 12/1982 | Petersen | ................ H02K 33/16 310/15 |
| 5,434,549 A | * | 7/1995 | Hirabayashi | ........... H02K 33/16 335/229 |
| 6,566,776 B2 | | 5/2003 | Hoffmann et al. | |
| 10,855,154 B2 | | 12/2020 | Takahashi et al. | |
| 11,192,141 B2 | | 12/2021 | Berrezag et al. | |
| 11,206,500 B2 | | 12/2021 | Kim et al. | |
| 12,003,155 B2 | | 6/2024 | Chiba et al. | |

(Continued)

FOREIGN PATENT DOCUMENTS

| | | |
|---|---|---|
| JP | H06315255 A | 11/1994 |
| JP | 2004357403 A | 12/2004 |
| WO | 2005115094 A2 | 12/2005 |

*Primary Examiner* — Tulsidas C Patel
*Assistant Examiner* — Robert E Mates
(74) *Attorney, Agent, or Firm* — HAUPTMAN HAM, LLP

(57) ABSTRACT

A vibrating motor includes a stationary portion, a movable element having a magnet member and capable of vibrating in a first direction, and an elastic member. The stationary portion has a coil that applies a driving force to the magnet member when the coil is energized, and a case that accommodates the movable element and the coil therein. The movable element has a holder member that holds one end portion in the first direction of the magnet member. The elastic member is connected to the holder member. The case has a case notch. The case notch is notched toward the other side in the first direction from one end in the first direction of the case. The holder member has a holder notch that is notched toward one side in a second direction perpendicular to the first direction. The case notch and the holder notch overlap as viewed in the second direction.

16 Claims, 17 Drawing Sheets

(56) References Cited

U.S. PATENT DOCUMENTS

| | | | |
|---|---|---|---|
| 2007/0040457 A1* | 2/2007 | Shimizu | A61C 17/3445 |
| | | | 310/15 |
| 2016/0336842 A1* | 11/2016 | Chun | H02K 33/16 |
| 2016/0372997 A1 | 12/2016 | Wang et al. | |
| 2017/0056927 A1* | 3/2017 | Chun | B06B 1/045 |
| 2018/0026511 A1 | 1/2018 | Akanuma et al. | |
| 2018/0281020 A1* | 10/2018 | Katada | B06B 1/045 |
| 2019/0115816 A1* | 4/2019 | Takahashi | A45D 29/14 |
| 2020/0059146 A1* | 2/2020 | Wang | H02K 33/16 |

\* cited by examiner

VIBRATING MOTOR WITH NOTCH IN CASE

CROSS-REFERENCE TO RELATED APPLICATIONS

The present invention claims priority under 35 U.S.C. § 119 to Japanese Patent Application No. 2020-167852 filed on Oct. 2, 2020, the entire content of which is incorporated herein by reference.

FIELD OF THE INVENTION

The present invention relates to a vibrating motor.

BACKGROUND

Conventionally, various devices such as portable devices like smartphones have often been provided with a vibrating motor as a vibration generator. The vibrating motor is used for a function of notifying the user of an incoming call, an alarm, or the like, or a function of tactile feedback in a human interface, for example.

A vibrating motor includes a case, a coil, an elastic member, and a movable element. The movable element often includes a magnet. The movable element and the case are connected by the elastic member. When the coil is energized to generate a magnetic field, the movable element vibrates.

In a case where the case is made of a magnetic material, there has been a possibility that a phenomenon occurs in which the movable element is attracted to and stuck to an inner surface of a housing by a suction force, and the movable element does not move. Note that the reason why the housing is made of a magnetic material is to form a magnetic circuit to increase the magnetic force.

Against this background, a conventional vibrating motor may be provided with a shaft fixed to a case. In this vibrating motor, the movable element reciprocates in the vibration direction along the shaft. This makes it possible to prevent the phenomenon in which the movable element sticks to the inner surface of the housing.

However, the vibrating motor provided with the shaft as described above has the following problems. Since the shaft is disposed to pass through the inside of the movable element, the weight of the movable element decreases and the magnetic force decreases due to the decrease in the magnet volume. As a result, the amount of vibration may decrease. Further, sliding between the movable element and the shaft may cause noise and wear.

SUMMARY

An exemplary vibrating motor of the present invention includes a stationary portion, a movable element having a magnet member and capable of vibrating in a first direction, and an elastic member. The stationary portion has a coil that applies a driving force to the magnet member when the coil is energized, and a case that accommodates the movable element and the coil therein. The movable element has a holder member that holds one end portion in the first direction of the magnet member. The elastic member is connected to the holder member. The case has a case notch. The case notch is notched toward the other side in the first direction from one end in the first direction of the case. The holder member has a holder notch that is notched toward one side in a second direction perpendicular to the first direction. The case notch and the holder notch overlap as viewed in the second direction.

The above and other elements, features, steps, characteristics and advantages of the present disclosure will become more apparent from the following detailed description of the preferred embodiments with reference to the attached drawings.

DETAILED DESCRIPTION

Figure 1:
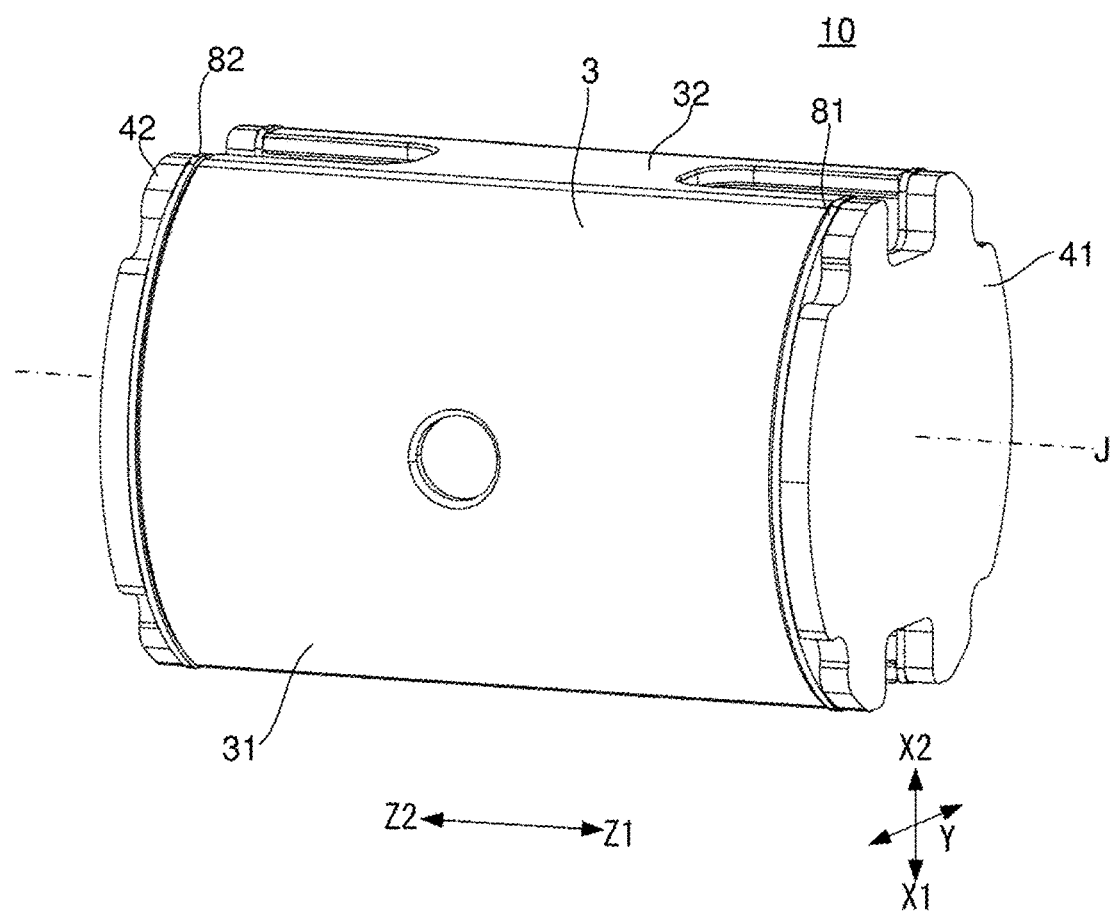
FIG. 1 is a perspective view of a vibrating motor according to an exemplary embodiment of the present disclosure.

An exemplary embodiment of the present disclosure will be described below with reference to the drawings.

Note that in the drawings, a first direction in which the movable element vibrates is defined as a Z direction, and one side in the first direction is defined as Z1, while the other side in the first direction is defined as Z2. Additionally, a second direction perpendicular to the first direction is defined as an X direction, and one side in the second direction is defined as X1, while the other side in the second direction is defined as X2. Additionally, a third direction perpendicular to the first direction and the second direction is referred to as a Y direction.

Figure 2:
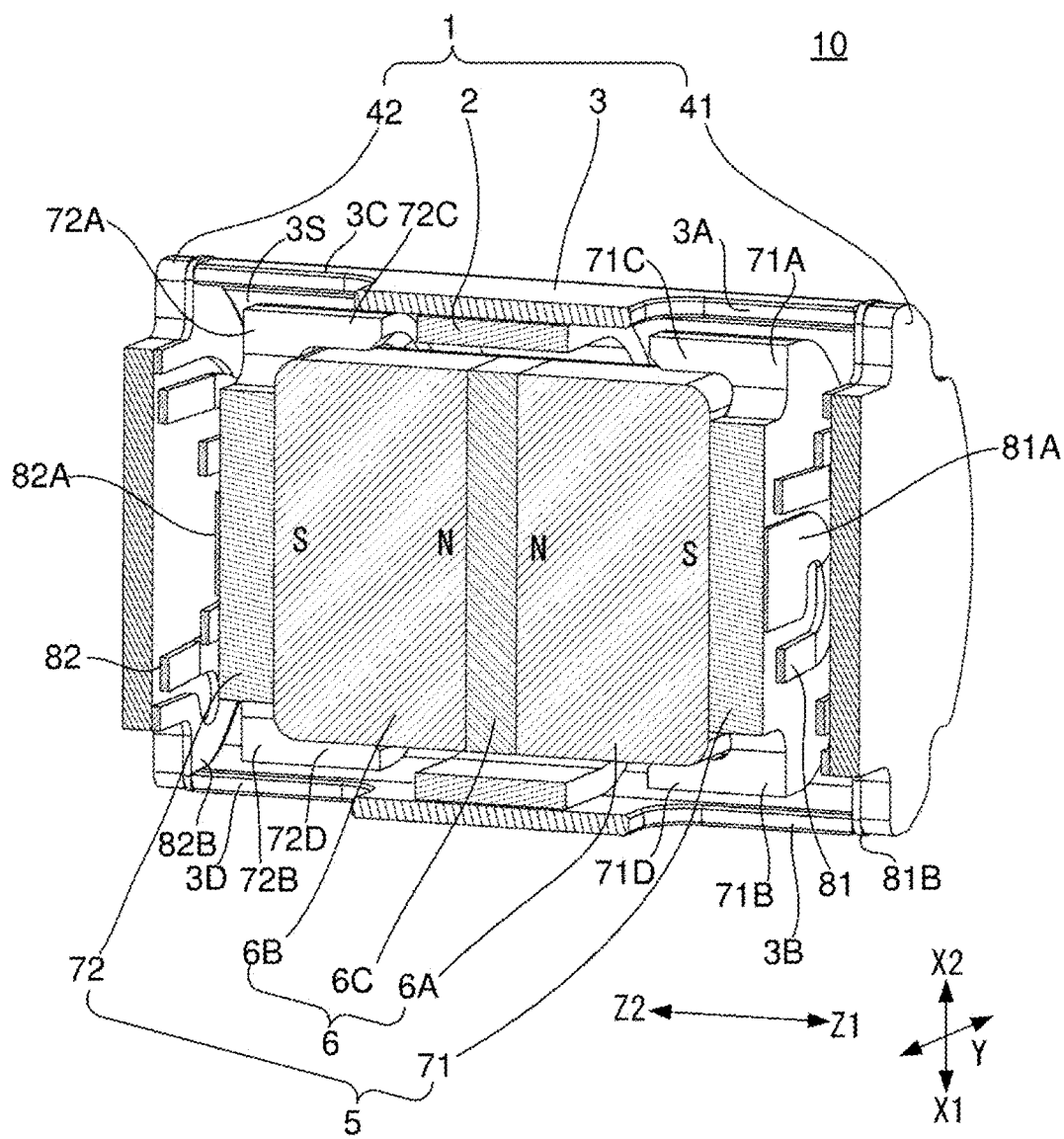
FIG. 2 is across-sectional perspective view of the vibrating motor according to the exemplary embodiment of the present disclosure.

FIG. 1 is a perspective view illustrating an external appearance of a vibrating motor 10 according to the exemplary embodiment of the present disclosure. FIG. 2 is a cross-sectional perspective view of the vibrating motor 10.

The vibrating motor 10 has a stationary portion 1, a movable element 5, and elastic members 81 and 82. The movable element 5 can vibrate in the first direction (Z direction).

The stationary portion 1 has a coil 2, a case 3, and lids 41 and 42. The case 3 has two curved surface portions 31 and two flat surface portions 32 as outer peripheral surfaces. The curved surface portions 31 face each other in the third direction. The flat surface portions 32 face each other in the second direction. The flat surface portion 32 is parallel to the first direction. The flat surface portions 32 are connected to each other by the curved surface portions 31. The case 3 has an internal space 3S that opens on both sides in the first direction. The case 3 is made of a magnetic material. The magnetic material is stainless steel, for example.

The coil 2 is formed by winding a conductive wire around a center axis J (FIG. 1) extending in the first direction of the vibrating motor 10, and is fixed to an inner surface of the case 3. That is, the case 3 accommodates the coil 2 therein. The coil 2 generates a magnetic field by being energized. The coil 2 is disposed at the center of the case 3 in the first direction.

Figure 3:
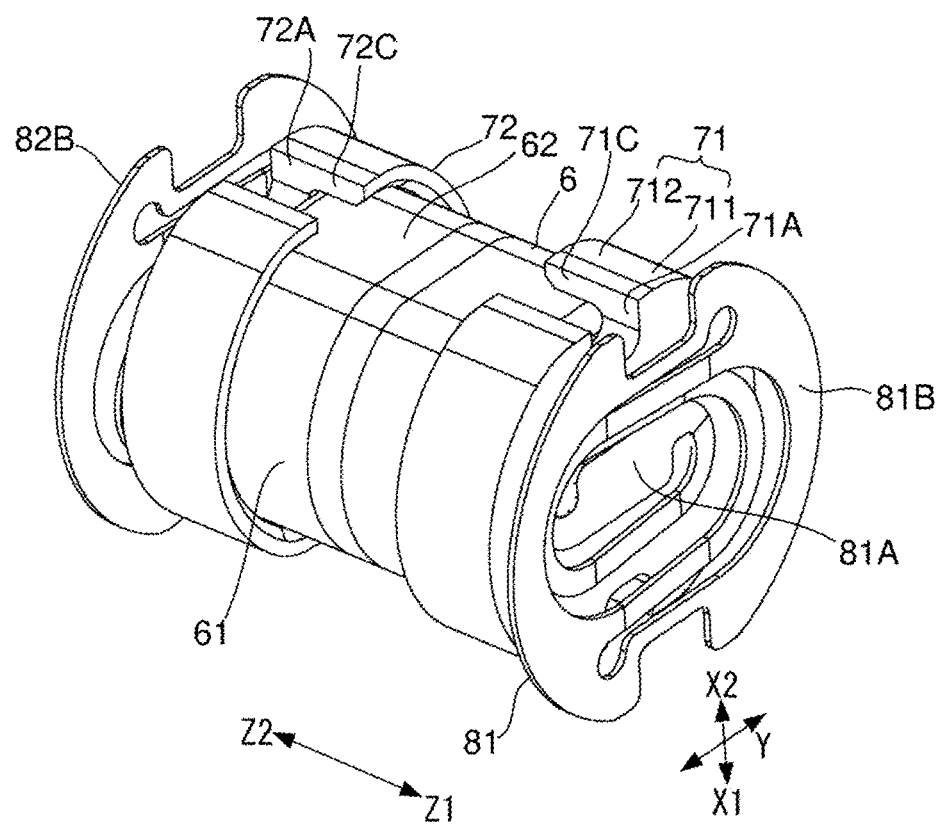
FIG. 3 is a perspective view illustrating a partial configuration of the vibrating motor.

The movable element 5 has a magnet member 6 and holder members 71 and 72, and is accommodated in the case 3. The magnet member 6 has a magnet 6A on one side in the first direction and a magnet 6B on the other side in the first direction. That is, the magnet member 6 has two magnets 6A and 6B arranged in the first direction. The magnet member 6 has a magnetic body portion 6C. The magnetic body portion 6C is sandwiched between the magnets 6A and 6B in the first direction. Here, as illustrated in FIG. 3, the magnet member 6 has two curved surface portions 61 and two flat surface portions 62 as outer peripheral surfaces. The curved surface portions 61 face each other in the third direction. The flat surface portions 62 face each other in the second direction. The flat surface portion 62 is parallel to the first direction. The flat surfaces portions 62 are connected to each other by the curved surface portions 61.

As illustrated in FIG. 2, of the magnet 6A, the other side in the first direction is an N pole, and one side in the first direction is an S pole. Of the magnet 6B, one side in the first direction is an N pole, and the other side in the first direction is an S pole. In this manner, the N poles face each other in the first direction with the magnetic body portion 6C interposed therebetween. That is, the magnetic poles of the magnets 6A and 6B on the side facing the magnetic body portion 6C are the same. As a result, the magnetic flux flows from the S pole to the N pole in the magnets 6A and 6B, flows radially outward in the magnetic body portion 6C, and penetrates the coil 2 in the radial direction. Note that the radial direction is a radial direction with respect to the center axis J. Since the case 3 is made of a magnetic material, the magnetic flux penetrating the coil 2 flows through the case 3 in the first direction and is returned to the S poles of the magnets 6A and 6B. With such a configuration, the amount of magnetic flux penetrating the coil 2 can be increased.

Figure 4:
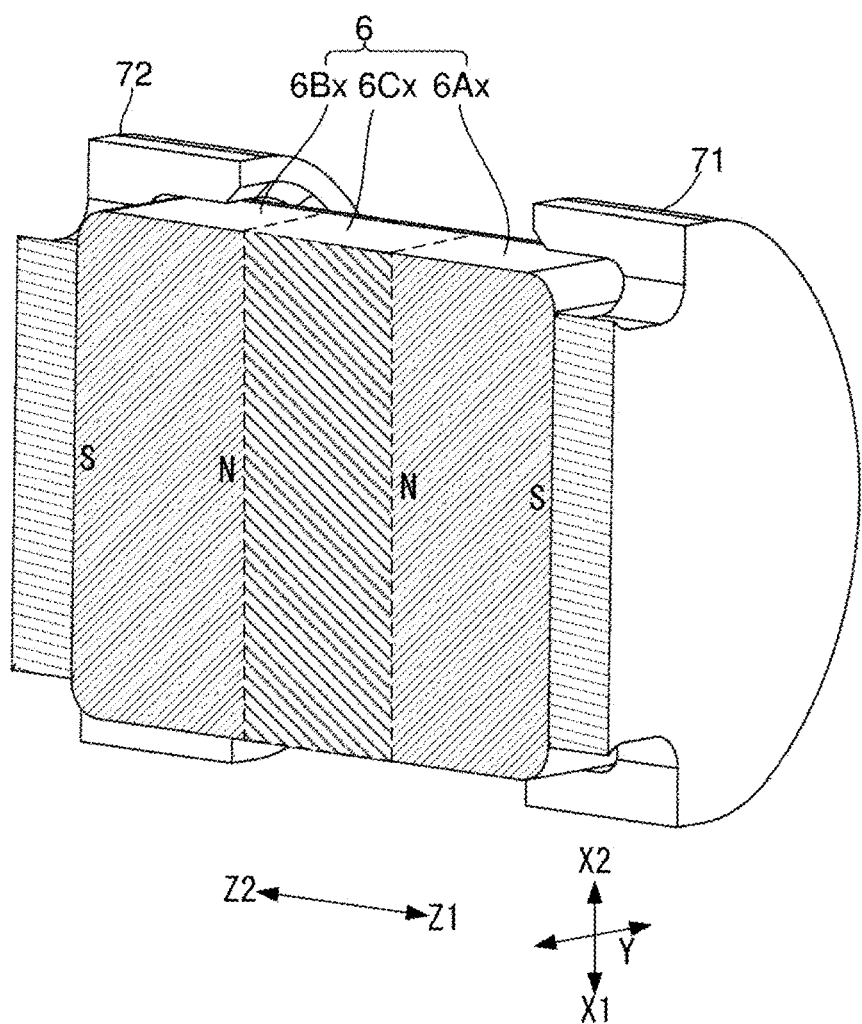
FIG. 4 is a cross-sectional perspective view illustrating a magnet member according to an exemplary modification of the present disclosure.

Note that the configuration of the magnet member 6 may be a modification as illustrated in FIG. 4. The magnet member 6 illustrated in FIG. 4 is a single member. The magnet member 6 has a magnetized region 6Ax on one side in the first direction and a magnetized region 6Bx on the other side in the first direction. That is, the magnet member 6 has two magnetized regions 6Ax and 6Bx arranged in the first direction. Additionally, the magnet member 6 has a non-magnetized region 6Cx sandwiched between the magnetized regions 6Ax and 6Bx in the first direction.

Additionally, as illustrated in FIG. 4, of the magnetized region 6Ax, the other side in the first direction is an N pole, and one side in the first direction is an S pole. Of the magnetized region 6Bx, one side in the first direction is an N pole, and the other side in the first direction is an S pole. In this manner, the N poles face each other in the first direction with the non-magnetized region 6Cx interposed therebetween. That is, the magnetic poles of the magnetized regions 6Ax and 6Bx on the side facing the non-magnetized region 6Cx are the same. With such a configuration, too, the amount of magnetic flux penetrating the coil in the radial direction can be increased. Further, by using the magnet member 6 which is a single member, it is possible to prevent misalignment due to assembly of magnet members as in a magnet member including a plurality of members, and to reduce cost.

Note that in the magnet or the magnetized regions with the above configuration, the N pole and the S pole may be reversed. In this case, the magnetic flux flows in a direction opposite to the above.

The description returns to the configuration of FIG. 2. As illustrated in FIG. 2, a holder member 71 holds one end portion in the first direction of the magnet member 6. More specifically, as illustrated in FIG. 3, the holder member 71 has a cover portion 711 and a cover portion 712. The cover portion 711 is a plate-like portion that covers one end surface in the first direction of the magnet member 6. The cover portion 712 is a cylindrical portion that protrudes to the other side in the first direction from the cover portion 711 and covers the outer peripheral surface of the magnet member 6. The holder member 71 functions as a weight, and is made of a tungsten alloy, for example.

The cover portion 711 has holder notches 71A and 71B. The holder notch 71A is notched toward one side in the second direction (FIG. 2). The holder notch 71B is notched toward the other side in the second direction (FIG. 2). That is, the holder member 71 has the holder notch 71A notched toward one side in the second direction perpendicular to the first direction.

The cover portion 712 has holes 71C and 71D extending to the other side in the first direction from the holder notches 71A and 71B (FIG. 2).

The case 3 has case notches 3A and 3B. The case notches 3A and 3B are notched toward the other side in the first direction from one end in the first direction of the case 3. The case notches 3A and 3B face each other in the second direction.

The case notch 3A and the holder notch 71A overlap as viewed in the second direction. The case notch 3A and the hole 71C also overlap as viewed in the second direction. The case notch 3B and the holder notch 71B overlap as viewed in the second direction. The case notch 3B and the hole 71D also overlap as viewed in the second direction.

Such holder notches 71A and 71B, holes 71C and 71D, and case notches 3A and 3B are configurations for positioning the movable element 5 with respect to the case 3 precisely using a jig at the time of manufacturing the vibrating motor 10, as will be described in detail later.

Note that the configuration of the holder member 72 and the configuration on the other side in the first direction of the case 3 are symmetrical to the configurations of the holder member 71 and the case notches 3A and 3B with respect to a symmetry axis passing through the center in the first direction of the vibrating motor 10 in the second direction in a cross-sectional view viewed in the third direction. Accordingly, the holder member 72 has holder notches 72A and 72B and holes 72C and 72D. Additionally, the case 3 has case notches 3C and 3D.

The elastic members 81 and 82 are compression springs that can expand and contract in the first direction. A fixing portion 81A located in the other end portion in the first direction of the elastic member 81 is fixed to one end surface in the first direction of the holder member 71 (FIG. 2). That is, the elastic member 81 is connected to the holder member 71. A fixing portion 81B located in one end portion in the first direction of the elastic member 81 is fixed to one end surface in the first direction of the case 3 (FIG. 2).

A fixing portion 82A located in one end portion in the first direction of the elastic member 82 is fixed to the other end surface in the first direction of the holder member 72 (FIG. 2). A fixing portion 82B located in the other end portion in the first direction of the elastic member 82 is fixed to the other end surface in the first direction of the case 3 (FIG. 2).

The lids 41 and 42 are plate-like members whose thickness direction is the first direction. The lid 41 is disposed on one side in the first direction of the elastic member 81 and is fixed to the fixing portion 81B. That is, the vibrating motor 10 has the lid 41 disposed on one side in the first direction of the case 3, and the elastic member 81 is sandwiched between the one end surface in the first direction of the case 3 and the lid 41. The lid 42 is disposed on the other side in the first direction of the elastic member 82 and is fixed to the fixing portion 82B.

In a non-operating state in which the coil 2 is not energized, the movable element 5 is in a stopped state where an elastic force toward the other side in the first direction by the elastic member 81 compressed from the natural length state and an elastic force toward one side in the first direction by the elastic member 82 compressed from the natural length state are applied to the movable element 5. In the non-operating state, the magnetic body portion 6C of the movable element 5 is located at the center in the first direction of the coil 2 (FIG. 2).

When the coil 2 is energized, a driving force is applied to the magnet member 6 by an interaction between a magnetic field generated by the coil 2 and a magnetic field generated by the magnet member 6. That is, the coil 2 applies a driving force to the magnet member 6 when the coil 2 is energized. When a driving force is applied to movable element 5, the movable element 5 vibrates in the first direction.

As described above, since the vibrating motor 10 can be configured not to use a shaft that guides the movable element as in the conventional case, it is possible to curb reduction in the weight of the movable element 5 and the volume of the magnet member 6. Accordingly, the amount of vibration of the vibrating motor 10 can be secured. Additionally, sliding between the movable element and the shaft is eliminated, and noise and wear due to sliding are avoided.

Here, the holder members 71 and 72 will be further described. At least a part of the holder members 71 and 72 as illustrated in FIG. 3 is preferably made of metal. An example of the metal is a tungsten alloy. As a result, the weight of the holder members 71 and 72 can be increased, and the amount of vibration can be increased. In this case, the fixing portions 81A and 82A of the elastic members 81 and 82 are fixed to the holder members 71 and 72 by, for example, welding, adhesion, crimping, or the like.

Additionally, at least a part of the holder members 71 and 72 is preferably made of a resin portion. In this case, the holder members 71 and 72 may be entirely made of the resin portion, or a part thereof may be made of metal and the remaining part thereof may be made of the resin portion. In the case where a part of the holder members 71 and 72 is made of a resin portion, the side to which the fixing portions 81A and 82A are fixed is made of the resin portion. In this case, the holder members 71 and 72 can be formed by insert molding, for example.

When at least a part of the holder members 71 and 72 is made of a resin portion as described above, the fixing portions 81A and 82A are fixed to the holder members 71 and 72 by, for example, adhesion, crimping, or the like. That is, the elastic members 81 and 82 are directly or indirectly fixed to the resin portion. Since the resin portion has good workability, the elastic members 81 and 82 can be attached at low cost with accuracy.

Figure 5:
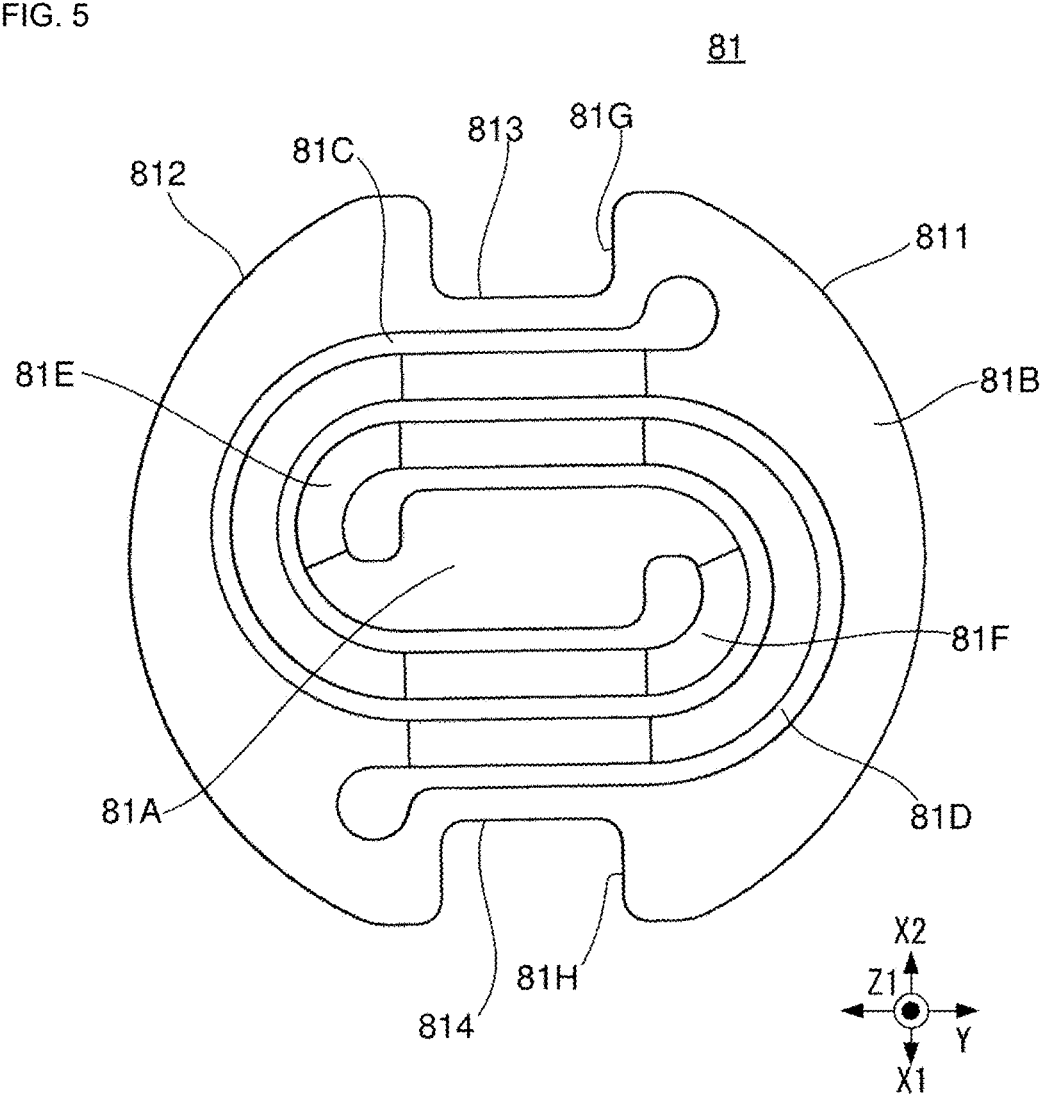
FIG. 5 is a plan view of an elastic member.

Here, the configurations of the elastic members 81 and 82 will be further described. FIG. 5 is a plan view of the elastic member 81 as viewed in the first direction.

As illustrated in FIG. 5, the elastic member 81 has an outer shape including two straight portions 813,814 arranged side by side in the second direction and two curved portions 811,812 arranged side by side in the third direction when viewed in the first direction. Additionally, the elastic member 81 has beams 81E and 81F. The beams 81E and 81F each include a straight portion and a curved portion, and connect the fixing portion 81A and the fixing portion 81B. The beams 81E and 81F are formed by the slits 81C and 81D. That is, the elastic member 81 has the beams 81E and 81F formed by at least two slits provided in a region surrounded by the outer shape described above.

As a result, by adjusting the lengths of the straight portions and the curved portions of the beams 81E and 81F, it is possible to set an appropriate resonance frequency while maintaining the rigidity and stress balance in the second direction and the third direction even with the elastic member 81 having the outer shape described above.

Next, an example of a manufacturing process of the vibrating motor 10 will be described. Note that hereinafter, the manufacturing process will be described using the first direction (Z direction), the second direction (X direction), and the third direction (Y direction) of the vibrating motor 10 at the time of completion.

Figure 6:
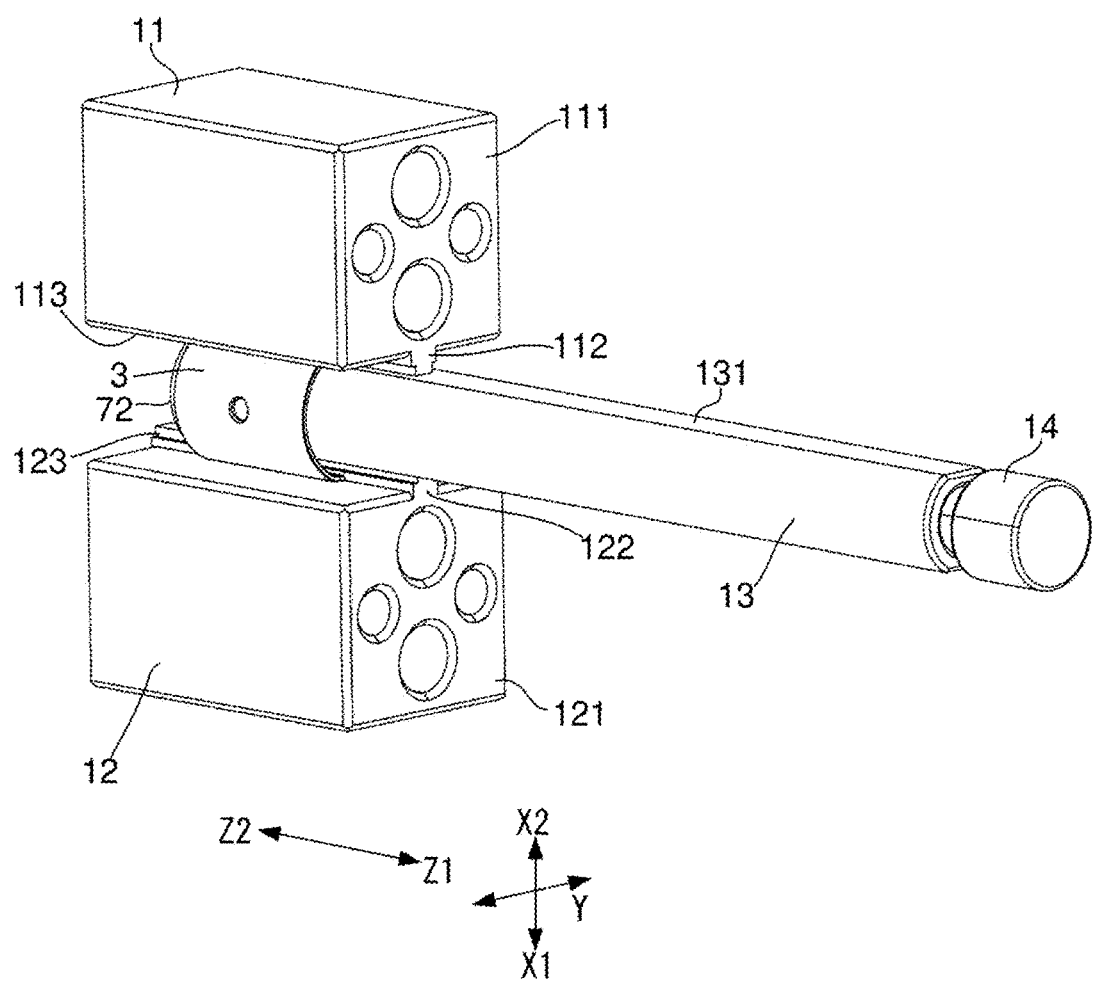
FIG. 6 is a perspective view illustrating a first step in the manufacturing process of the vibrating motor.

FIG. 6 is a perspective view illustrating the first step. The first step is a step of drawing the holder member 72 fixed to the magnet member 6 in advance with an adhesive into the case 3. In the first step, jigs 11, 12, 13, and 14 are used.

First, the case 3 is sandwiched by the jigs 11 and 12 from both sides in the second direction. More specifically, the jig 11 has a base 111 having a rectangular shape and two guide rails 112 and 113. Note that the guide rail 113 is hidden and not illustrated in FIG. 6.

Figure 7:
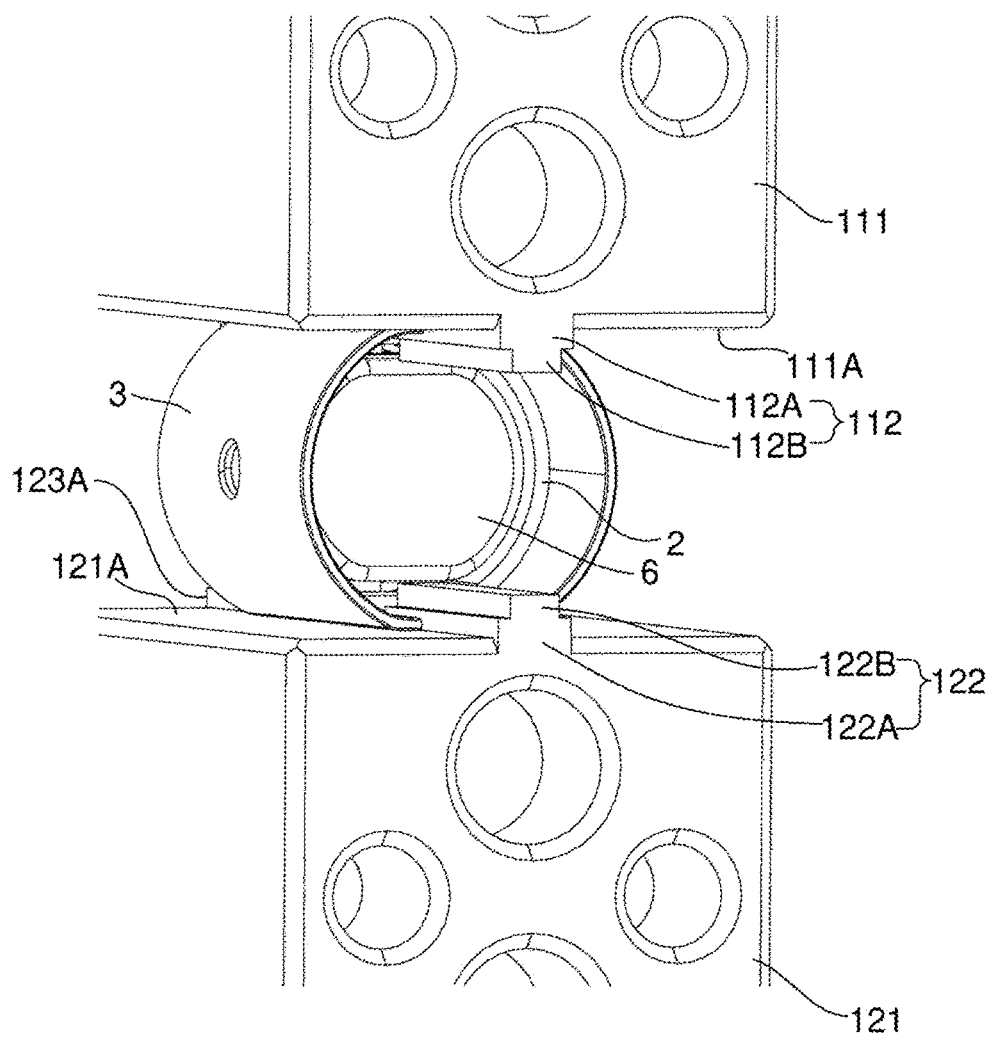
FIG. 7 is an enlarged view of a part of FIG. 6.

Here, FIG. 7 is an enlarged view of a part of the state of FIG. 6 from which the jig 13 is omitted. As illustrated in FIG. 7, the guide rail 112 has a base portion 112A and a protrusion 112B. The base portion 112A has a rectangular shape protruding toward one side in the second direction from one side surface 111A in the second direction of the base 111 and extending in the first direction. The protrusion 112B has a rectangular shape protruding from the base portion 112A and extending in the first direction. The width in the third direction of the protrusion 112B is narrower than that of the base portion 112A.

The guide rail 113 protrudes toward one side in the second direction from the one side surface 111A in the second direction of the base 111, and has the same shape as the guide rail 112. The guide rail 113 is disposed on the other side in the first direction of the guide rail 112 with a first space from the guide rail 112.

As illustrated in FIG. 6, when the jig 11 is set in the case 3, the one side surface 111A in the second direction is brought into contact with the flat surface portion 32 (FIG. 1) on the other side in the second direction of the case 3. At this time, the portion sandwiched in the first direction by the case notches 3A and 3C of the case 3 fits into the first space, and inner surfaces of the case notches 3A and 3C come into contact with side surfaces of the base portions 112A and 113A. Note that the base portion 113A is a base portion (not illustrated) of the guide rail 113.

The jig 12 has a base 121 and guide rails 122 and 123. Since the configuration of the jig 12 is a configuration in which the configuration of the jig 11 is reversed in the second direction, detailed description thereof will be omitted. A second space is disposed between the guide rails 122 and 123. As illustrated in FIG. 6, when the jig 12 is set in the case 3, the other side surface 121A (FIG. 7) in the second direction of the base 121 is brought into contact with the flat surface portion 32 on one side in the second direction of the case 3. At this time, the portion sandwiched in the first direction by the case notches 3B and 3D of the case 3 fits into the second space, and inner surfaces of the case notches 3B and 3D come into contact with side surfaces of the base portions 122A and 123A (FIG. 7) of the guide rails 122 and 123.

With the jigs 11 and 12 set in the case 3 as described above, the magnet member 6 to which the holder member 72 is fixed is inserted between the guide rails 113 and 123 from the other side in the first direction. When the magnet member 6 is inserted, each flat surface portion 62 (FIG. 3) of the magnet member 6 comes into contact with protrusions 113B and 123B of the guide rails 113 and 123. As a result, the magnet member 6 is positioned in the second direction. Additionally, the holder notch 72A and the hole 72C of the holder member 72 come into contact with a side surface of the protrusion 113B, and the holder notch 72B and the hole 72D come into contact with a side surface of the protrusion 123B. As a result, the magnet member 6 is positioned in the third direction.

Then, the jig 13 illustrated in FIG. 6 is inserted between the guide rails 112 and 122 from one side in the first direction. The jig 13 is a cylindrical member extending in the first direction. The jig 13 has flat surface portions 131 on both sides in the second direction as an outer peripheral surface. When the jig 13 is inserted, each flat surface portion 131 comes into contact with the protrusions 112B and 122B.

Since the jig 13 is formed of a magnetic material, the magnet member 6 is fixed to the other end in the first direction of the inserted jig 13. Then, when the jig 13 is pulled toward one side in the first direction, the magnet member 6 is drawn into the case 3. Then, the jig 14 illustrated in FIG. 6 is inserted into the jig 13. Since the jig 14 is formed of a non-magnetic material, when the magnet member 6 is pushed toward the other side in the first direction by the jig 14, the magnet member 6 is detached from the jig 13. This completes the first step.

Figure 8:
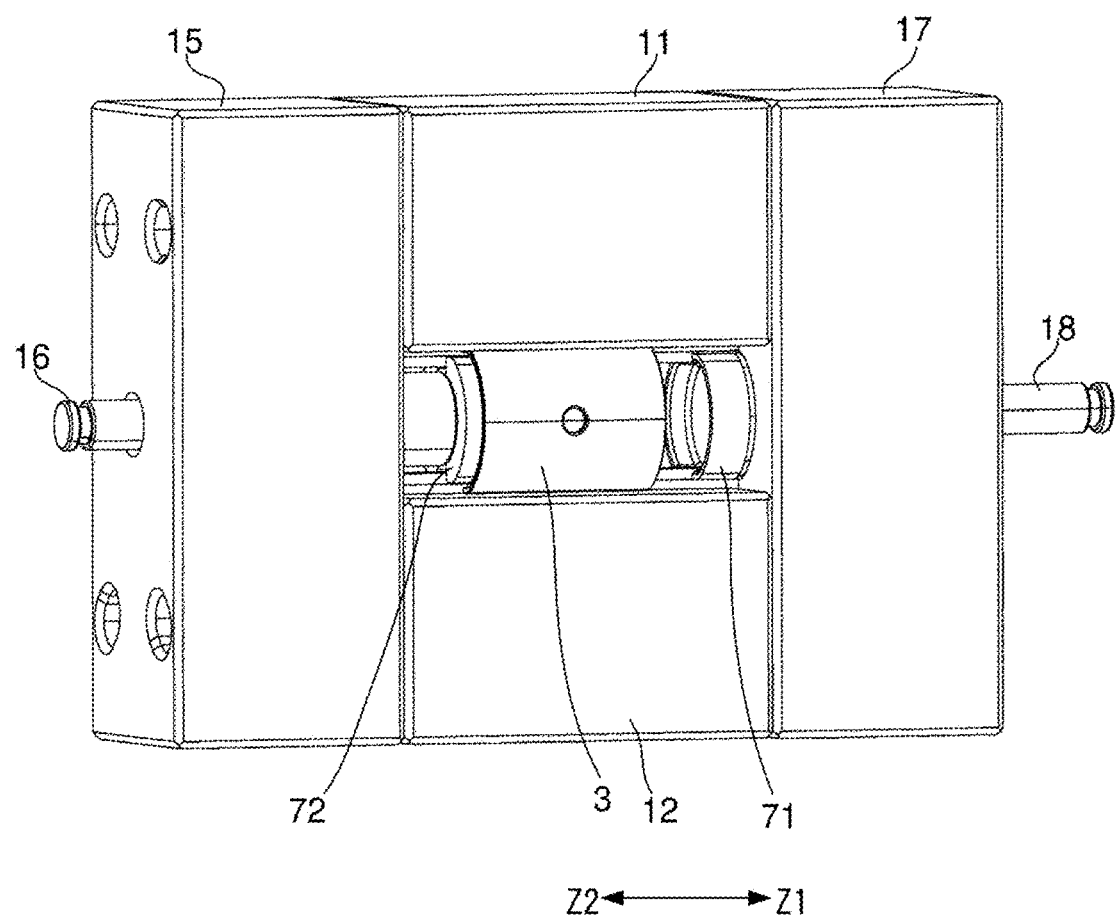
FIG. 8 is a perspective view illustrating a second step in the manufacturing process of the vibrating motor.

FIG. 8 is a perspective view illustrating the second step. The second step is a step of fixing the holder member 71 to the magnet member 6. In the second step, jigs 15, 16, 17, and 18 are used.

As illustrated in FIG. 8, the jig 15 is disposed in contact with the other side surface in the first direction of the jigs 11 and 12. The cylindrical jig 16 extending in the first direction is inserted into the jig 15 and is movable in the first direction.

Additionally, as illustrated in FIG. 8, the jig 17 is disposed in contact with one side surface in the first direction of the jigs 11 and 12. The cylindrical jig 18 extending in the first direction is inserted into the jig 17 and is movable in the first direction. Since the jig 18 is formed of a magnetic material, the holder member 71 is fixed to the other side surface in the first direction of the jig 18. The holder member 71 is inserted into the guide rails 112 and 122 from one side in the first direction. In the inserted state, the holder notch 71A and the hole 71C of the holder member 71 are in contact with a side surface of the protrusion 112B of the guide rail 112, and the holder notch 71B and the hole 71D are in contact with a side surface of the protrusion 122B of the guide rail 122.

Then, while pushing the holder member 72 toward one side in the first direction by the jig 16, the holder member 71 is pushed toward the other side in the first direction by the jig 18, so that the holder member 71 fits into the magnet member 6. Since an adhesive is applied to the holder member 71 in advance, the holder member 71 can be fixed to the magnet member 6 by adhesion. This completes the second step.

Figure 9:
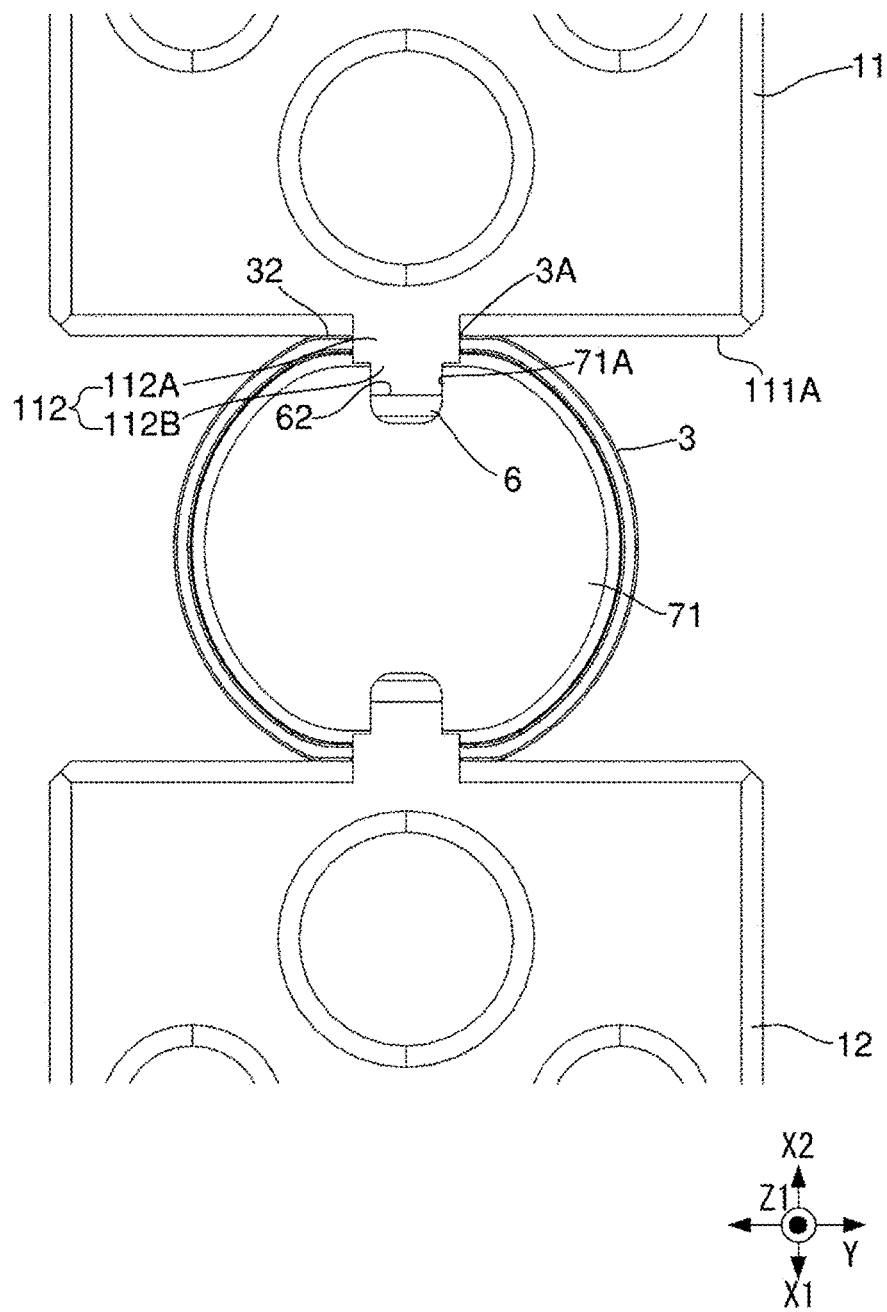
FIG. 9 is a plan view of a holder member as viewed from one side in a first direction.

Here, FIG. 9 is a plan view seen from one side in the first direction in a state where the holder member 71 is fixed to the magnet member 6. As illustrated in FIG. 9, the base portion 112A of the guide rail 112 is in contact with the case notch 3A of the case 3, and the protrusion 112B of the guide rail 112 is in contact with the holder notch 71A of the holder member 71. Additionally, the one side surface 111A in the second direction of the base 111 is in contact with the flat surface portion 32 of the case 3, and the protrusion 112B is in contact with the flat surface portion 62 of the magnet member 6. As a result, the movable element 5 is positioned in the second direction and the third direction with respect to the case 3, and the center axes extending in the first direction of the movable element 5 and the case 3 can be aligned.

Figure 10:
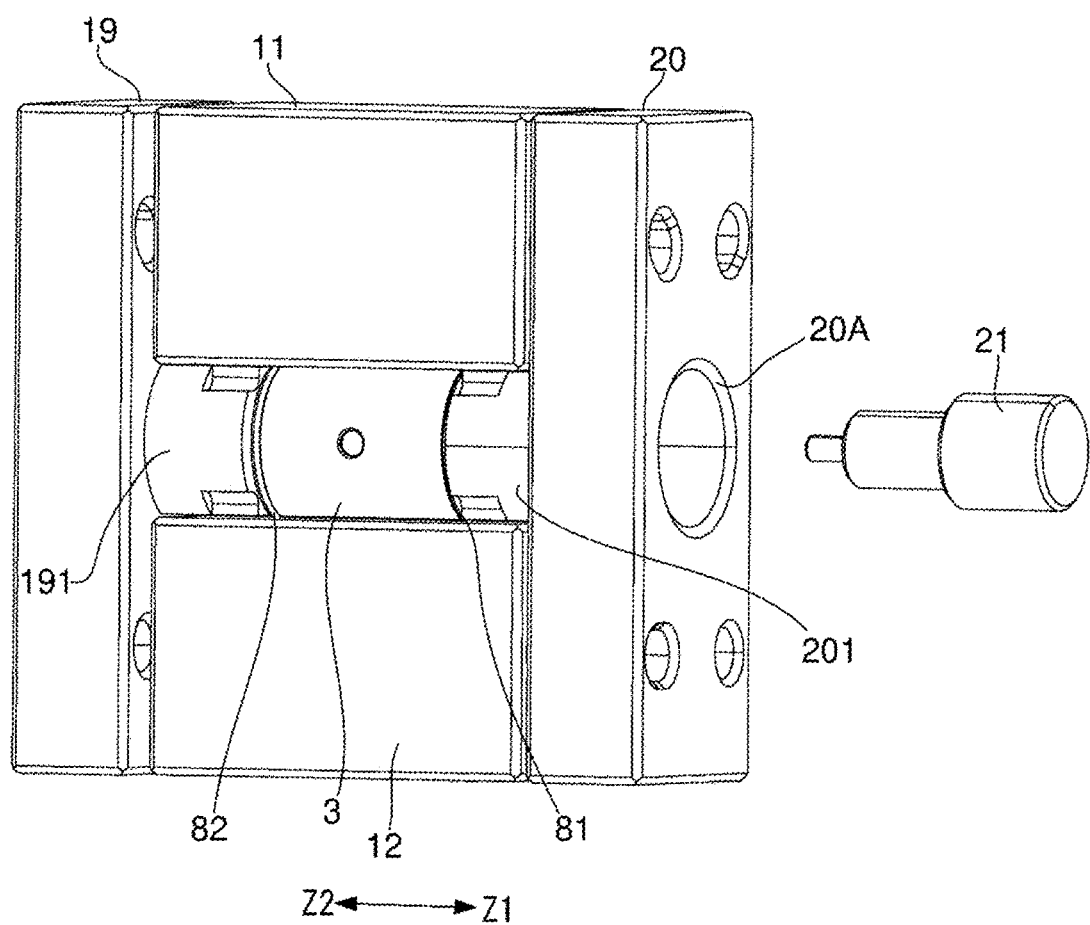
FIG. 10 is a perspective view illustrating a third step in the manufacturing process of the vibrating motor.

FIG. 10 is a perspective view illustrating the third step. The third step is a step of fixing the elastic members 81 and 82 to the holder members 71 and 72. In the third step, jigs 19, 20, and 21 are used.

As illustrated in FIG. 10, the elastic member 82 is inserted into the guide rails 113 and 123 from the other side in the first direction and brought into contact with the other side surface in the first direction of the case 3. Here, as illustrated in FIG. 5, the elastic member 81 has elastic member notches 81G and 81H. The elastic member notch 81G is notched toward one side in the second direction. The elastic member notch 81H is notched toward the other side in the second direction. The elastic member 82 also has elastic member notches similar to the elastic member 81.

The width in the third direction of the elastic member notches of the elastic member 82 is the same as the width in the third direction of the case notches 3C and 3D. As a result, the elastic member notches of the elastic member 82 can be brought into contact with side surfaces of the base portions 113A and 123A of the guide rails 113 and 123, and the elastic member 82 can be positioned in the second direction with respect to the case 3.

Then, as illustrated in FIG. 10, the jig 19 is brought into contact with the other side surface in the first direction of the jigs 11 and 12. The jig 19 has a protrusion 191 protruding to one side in the first direction. The elastic member 82 is sandwiched between the protrusion 191 and the case 3.

Additionally, as illustrated in FIG. 10, the elastic member 81 is inserted into the guide rails 112 and 122 from one side in the first direction and brought into contact with one side surface in the first direction of the case 3. The width in the third direction of the elastic member notches 81G and 81H is the same as the width in the third direction of the case notches 3A and 3B. As a result, the elastic member notches 81G and 81H can be brought into contact with side surfaces of the base portions 112A and 122A of the guide rails 112 and 122, and the elastic member 81 can be positioned in the second direction with respect to the case 3.

Then, as illustrated in FIG. 10, the jig 20 is brought into contact with one side surface in the first direction of the jigs 11 and 12. The jig 20 has a protrusion 201 protruding to the other side in the first direction. The elastic member 81 is sandwiched between the protrusion 201 and the case 3.

Then, the cylindrical jig 21 extending in the first direction as illustrated in FIG. 10 is inserted into a hole 20A of the jig 20, and the fixing portion 81A of the elastic member 81 is pushed into the other side in the first direction by the jig 21. As a result, the fixing portion 82A of the elastic member 82 is pressed against the holder member 72 by an elastic force.

Figure 11:
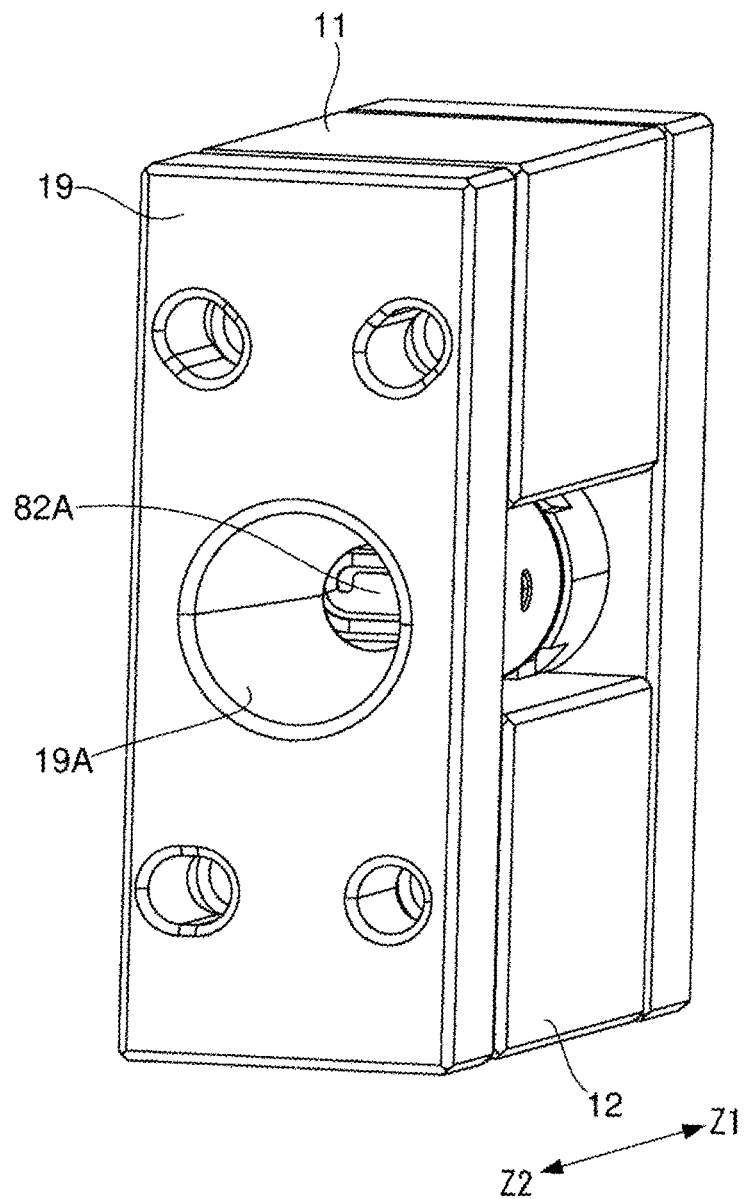
FIG. 11 is a perspective view for describing laser welding in the third step.

In this state, as illustrated in FIG. 11, the fixing portion 82A of the elastic member 82 can be visually checked through a hole 19A of the jig 19. By irradiating the fixing portion 82A with a laser through the hole 19A, the fixing portion 82A is fixed to the holder member 72 by welding.

Note that the fixing portion 82B of the elastic member 82 may be temporarily fixed to the case 3 by spot welding at several points. Note, however, that this temporary fixing is not essential.

Then, the jig 21 is inserted into the hole 19A of the jig 19, and the fixing portion 82A of the elastic member 82 is pushed into one side in the first direction by the jig 21. As a result, the fixing portion 81A of the elastic member 81 is pressed against the holder member 71 by an elastic force.

In this state, the fixing portion 81A is irradiated with a laser through the hole 20A to fix the fixing portion 81A to the holder member 71 by welding. Note that the fixing portion 81B may be temporarily fixed to the case 3 by spot welding at several points. Note, however, that this temporary fixing is not essential.

Figure 12:
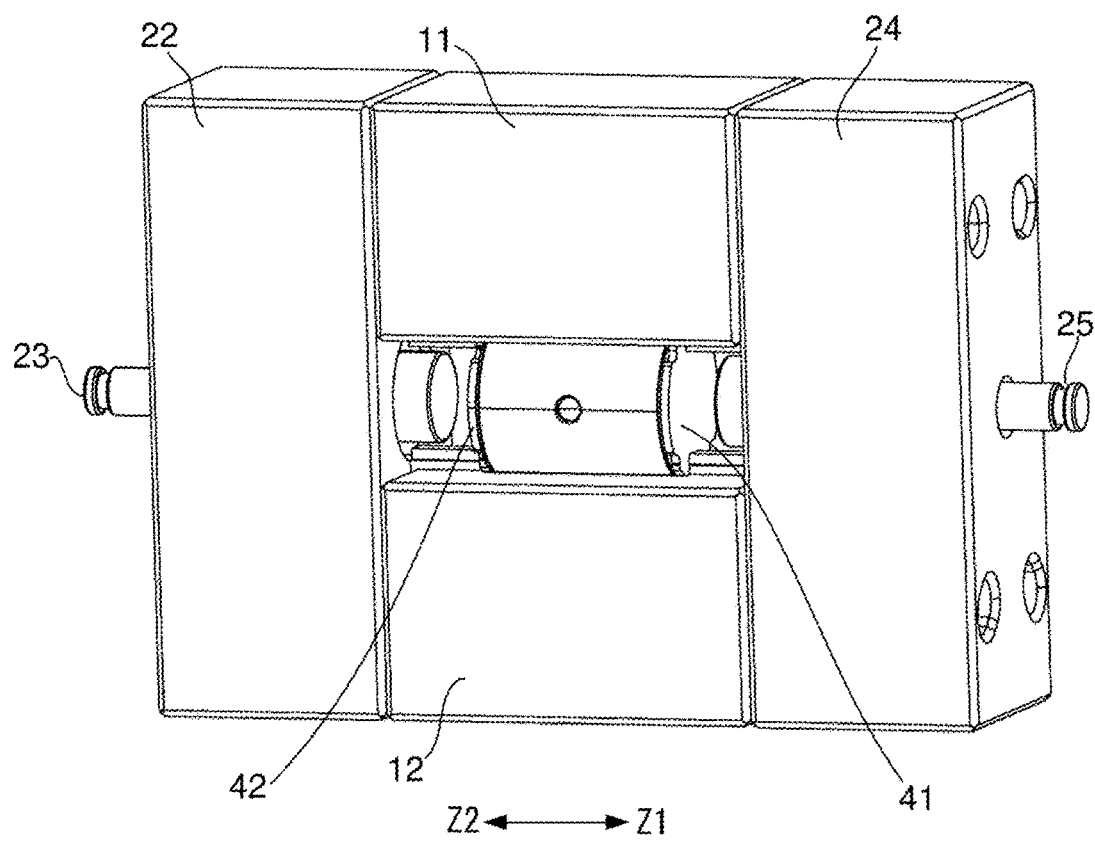
FIG. 12 is a perspective view illustrating a fourth step in the manufacturing process of the vibrating motor.

FIG. 12 is a perspective view illustrating the fourth step. The fourth step is a step of fixing the lids 41 and 42 to the elastic members 81 and 82. In the fourth step, jigs 22, 23, 24, and 25 are used. A pin-shaped jig 23 extending in the first direction is inserted into the jig 22 in advance, and the jig 23 and the jig 22 are connected by an elastic member (not illustrated). A pin-shaped jig 25 extending in the first direction is inserted into the jig 24 in advance, and the jig 25 and the jig 24 are connected by an elastic member (not illustrated).

As illustrated in FIG. 12, the lid 41 is inserted into the guide rails 112 and 122 from one side in the first direction. Then, the jig 24 is brought into contact with one side surface in the first direction of the jigs 11 and 12 while the other end surface in the first direction of the jig 25 is brought into contact with the lid 41. In this state, the jig 25 presses the lid 41 against the fixing portion 81B of the elastic member 81 on the other side in the first direction by the elastic force of the elastic member. Similarly, the jig 22 is brought into contact with the other side surface in the first direction of the jigs 11 and 12 while one end surface in the first direction of the jig 23 is brought into contact with the lid 42. In this state, the jig 23 presses the lid 42 against the fixing portion 82B of the elastic member 82 on one side in the first direction by the elastic force of the elastic member.

Figure 14:
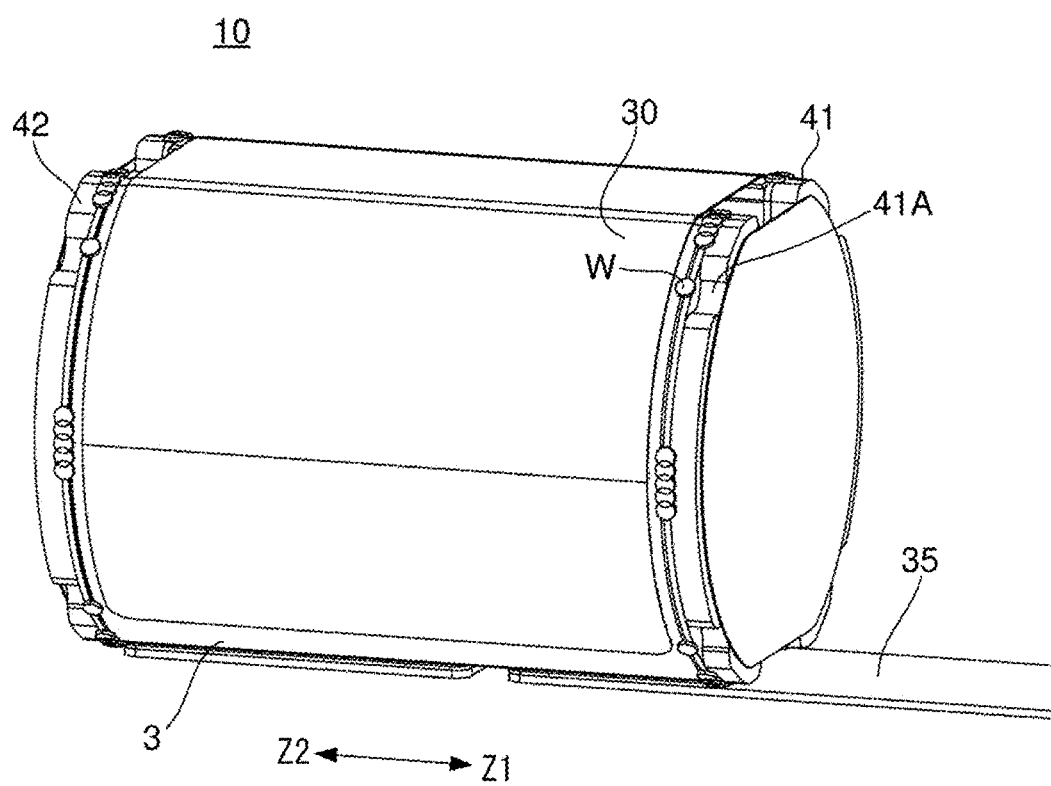
FIG. 14 is a perspective view illustrating a vibrating motor having a cover member and a circuit board.

In this state, the lid 41, the fixing portion 81B, and the case 3 are welded. Here, as illustrated in FIG. 14 to be described later, the lid 41 has a recess 41A. The recess 41A is recessed inward from an outer peripheral surface of the lid 41. The recesses 41A are provided in four points in the circumferential direction, for example. Note that the circumferential direction is a direction around the center axis J. A welded portion W by the temporary fixing mentioned above is disposed in a circumferential position of the recess 41A. As a result, when the lid 41 and the elastic member 81 are welded, it is possible to prevent the lid 41 and the elastic member 81 from being welded adjacent to the welded portion W, and to curb deformation of the welded portion W.

Similarly, the lid 42 is fixed to the elastic member 82 by welding while being pressed against the elastic member 82 by the jig 23.

As described above, in the vibrating motor 10, it is possible to position the movable element 5 with respect to the case 3 precisely at the time of assembling the vibrating motor. As a result, it is possible to avoid sticking of the movable element 5 to the case 3 while eliminating use of a shaft.

Figure 13:
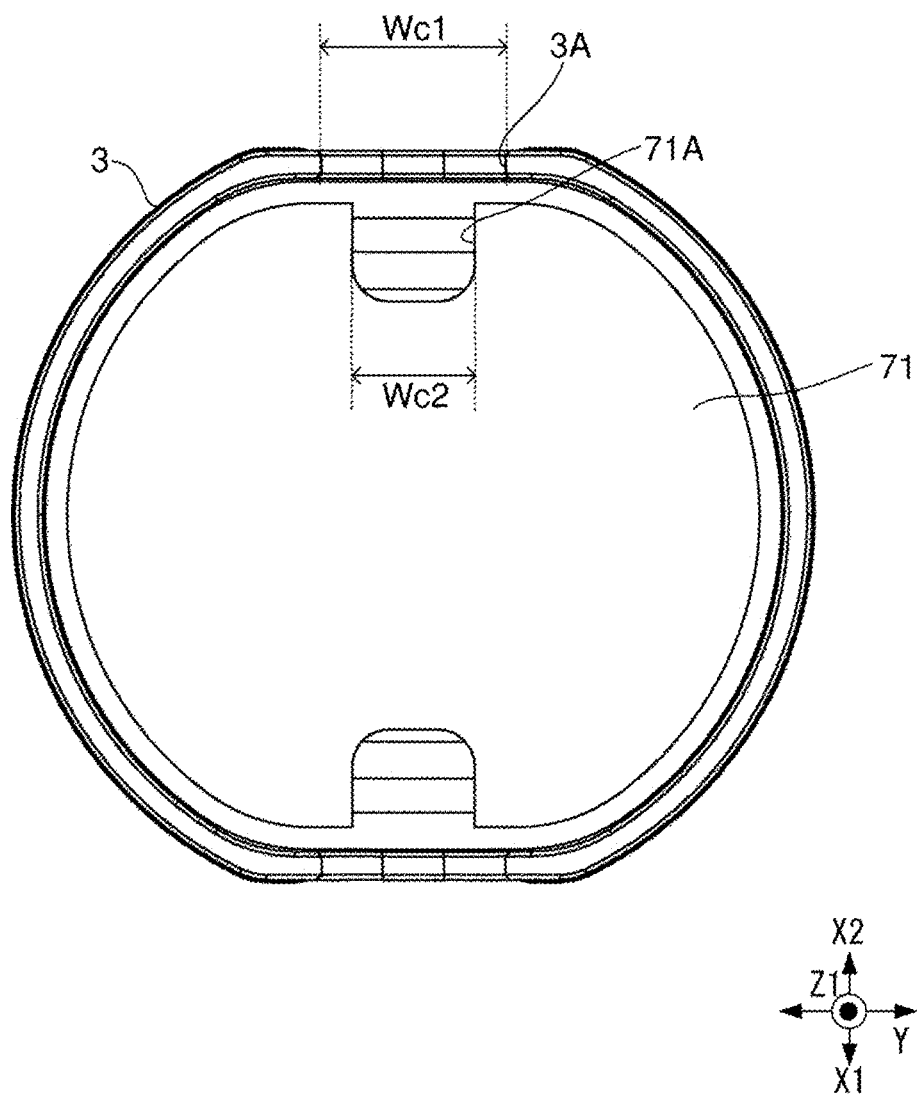
FIG. 13 is a plan view of the holder member as viewed from one side in the first direction.

Additionally, as illustrated in FIG. 13, a width Wc2 in the third direction of the holder notch 71A is shorter than a width Wc1 in the third direction of the case notch 3A. As a result, in the jig 11 (FIG. 6), the width of the protrusion 112B becomes shorter than the width of the base portion 112A, so that the jig 11 can be inserted into the case notch 3A. Additionally, the position of the holder member 71 with respect to the case 3 can be visually checked through the case notch 3A. Note that Wc1=Wc2 is also conceivable.

Additionally, as illustrated in FIG. 13, both an inner end surface on the other side in the second direction of the holder notch 71A and an inner end surface on one side in the first direction of the case notch 3A are planes parallel to the second direction. As a result, the movable element 5 can be positioned precisely using the jig 11, and sticking of the movable element 5 to the case 3 can be avoided.

Additionally, both the magnet member 6 and the case 3 have an outer peripheral surface including two flat surface portions 62 and 32 arranged in the second direction and two curved surface portions 61 and 31 arranged in the third direction and connecting the flat surface portions 62 and 32 (FIGS. 1 and 3). As a result, the jig 11 and the magnet member 6, and the jig 11 and the case 3 can be brought into contact with each other at the flat surface portion reliably, so that the movable element 5 can be positioned with accuracy (FIG. 9).

Additionally, the flat surface portions 62 and 32 of the magnet member 6 and the case 3 are parallel to the third direction. As a result, the movable element 5 can be positioned precisely using the jig 11.

As illustrated in FIG. 14, the vibrating motor 10 is preferably provided with a cover member 30. That is, the vibrating motor 10 has the cover member 30. The cover member 30 is attached to the outer peripheral surface of the case 3 and covers the case notches 3A and 3C. The cover member 30 is a tape using a polyimide film as a base material, for example. As a result, it is possible to prevent foreign matter from entering the case 3 through the case notches 3A and 3C.

Figure 15:
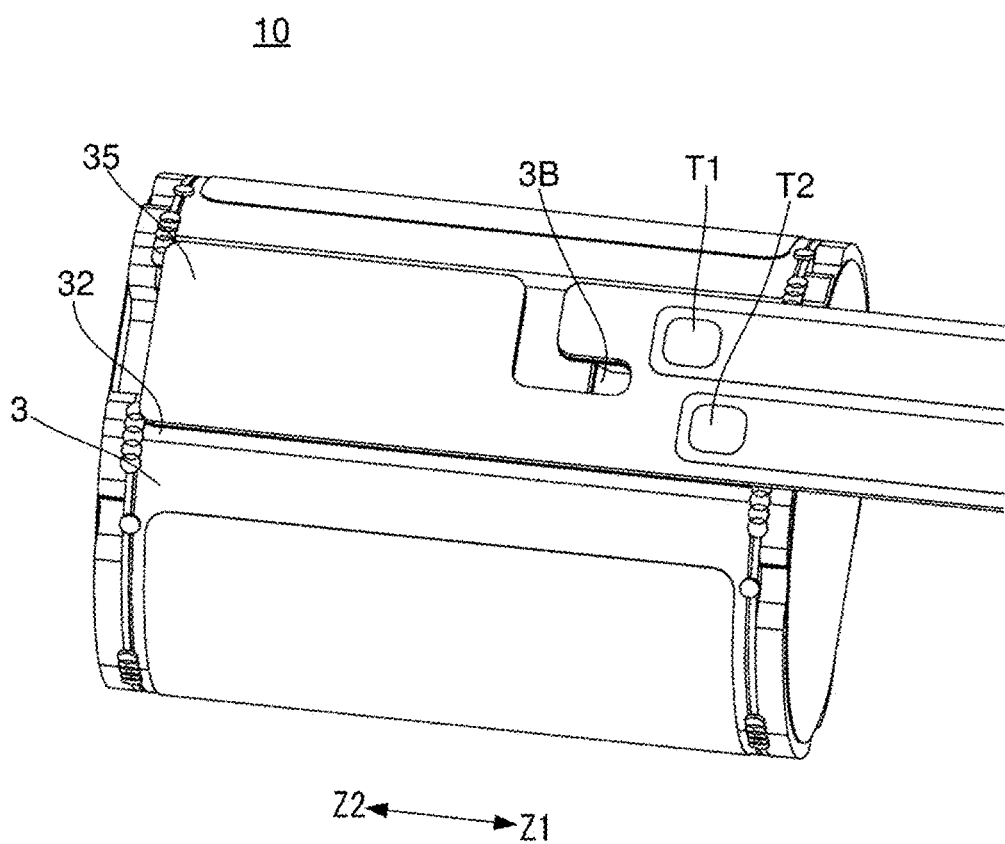
FIG. 15 is a perspective view of the vibrating motor illustrated in FIG. 14 as viewed from the circuit board side.

Additionally, the vibrating motor 10 may be provided with a circuit board 35 as illustrated in FIGS. 14 and 15. As illustrated in FIG. 15, the flat surface portion 32 of the case 3 is formed over the entire first direction of the case 3. The vibrating motor 10 has the circuit board 35 attached to the flat surface portion 32. As a result, since the entire board surface to which the circuit board 35 is attached is flat, the circuit board 35 can be fixed stably. Additionally, in the circuit board 35, a region where terminals T1 and T2 to which the coil 2 is connected are provided can be formed in a flat surface shape.

Additionally, the circuit board 35 has the two terminals T1 and T2 arranged in the region of the circuit board 35 attached to the flat surface portion 32. Two lead wires (not illustrated) of the coil 2 are connected to corresponding ones of the terminals T1 and T2 through the case notch 3B. A distance in the first direction between one terminal T1 and the case notch 3B is different from a distance in the first direction between the other terminal T2 and the case notch 3B. By varying the lengths of the two lead wires, it is possible to avoid misconnection in which the winding start lead wire and the winding end lead wire are connected to the terminals T1 and T2 in reverse to the originally intended combination. Accordingly, a voltage in the same direction can be applied to the coil 2 in the mass-produced vibrating motor 10.

Figure 16:
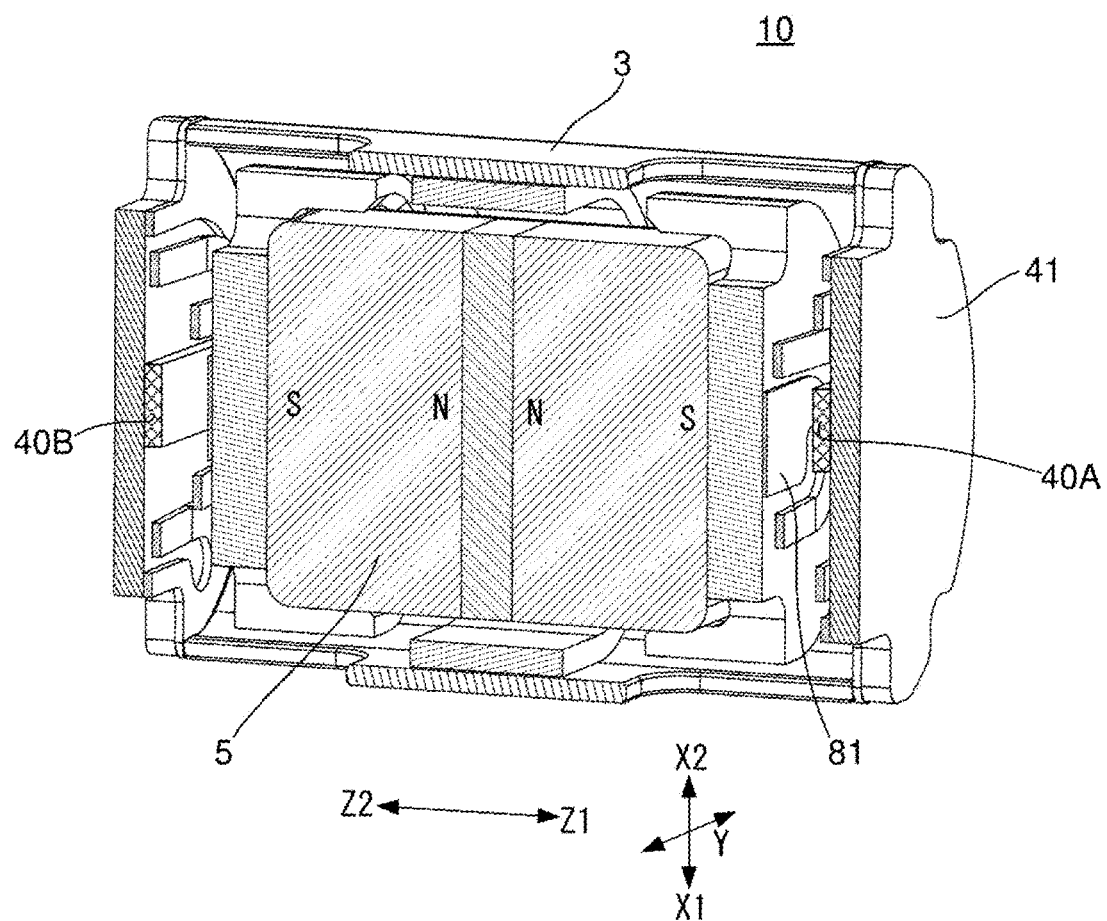
FIG. 16 is a cross-sectional perspective view illustrating a vibrating motor using a buffer member.

As illustrated in FIG. 16, a vibrating motor 10 may be provided with buffer members 40A and 40B. As illustrated in FIG. 16, the vibrating motor 10 has a lid 41 and the buffer member 40A disposed on one side in the first direction of a case 3. An elastic member 81 is disposed between a movable element 5 and the lid 41. The buffer member 40A is disposed on an inner surface of the lid 41 facing one end surface in the first direction of the movable element 5. This makes it possible to avoid collision between the elastic member 81 and the lid 41 due to movement of the movable element 5 when the product falls. The buffer members 40A and 40B are made of, for example, silicone rubber, thermoplastic polyurethane, or the like.

Figure 17:
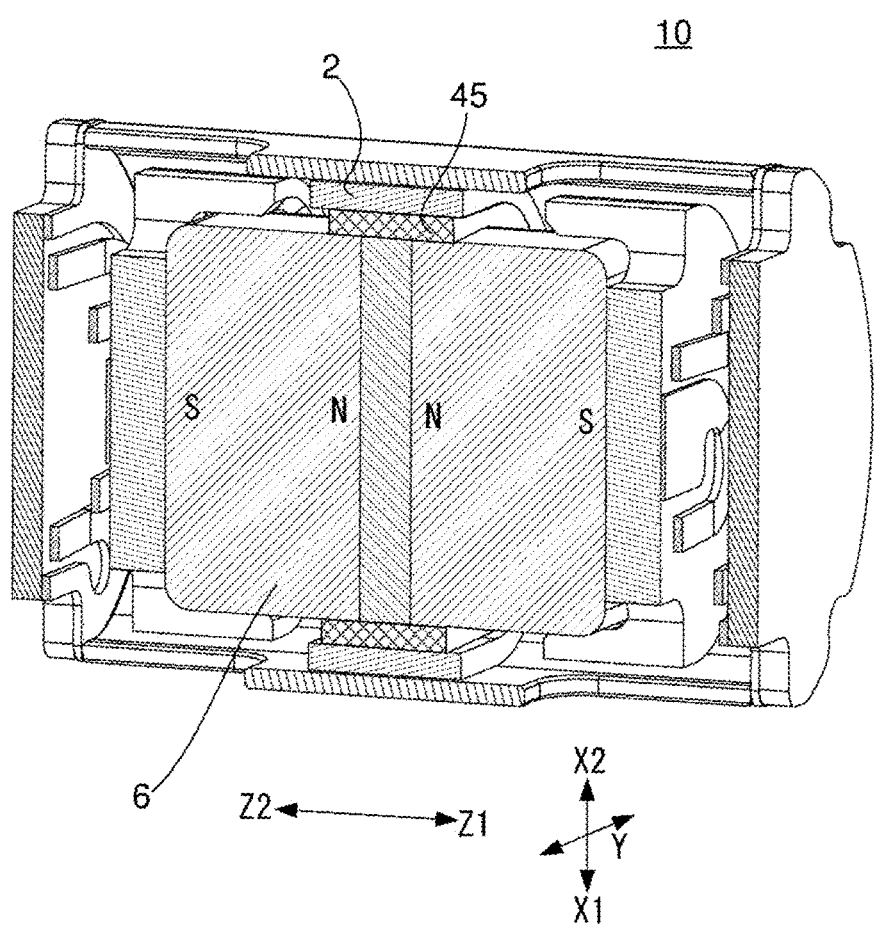
FIG. 17 is a cross-sectional perspective view illustrating a vibrating motor using a magnetic fluid.

As illustrated in FIG. 17, a vibrating motor 10 may be provided with a magnetic fluid 45. As illustrated in FIG. 17, the vibrating motor 10 has the magnetic fluid 45 disposed between an outer peripheral surface of a magnet member 6 and an inner peripheral surface of a coil 2. The magnetic fluid 45 can adjust the damper function and the sharpness of resonance.

The present disclosure can be used for a vibrating motor mounted on various devices such as portable devices, for example.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibrating motor comprising:
a stationary portion;
a movable element including a magnet member and capable of vibrating in a first direction; and
an elastic member, wherein:
the stationary portion includes a coil that applies a driving force to the magnet member when the coil is energized, and a case that accommodates the movable element and the coil therein;
the movable element includes a holder member that holds one end portion in the first direction of the magnet member; the elastic member is connected to the holder member;
the case includes a case notch;
the case notch is notched toward an other side in the first direction from one end in the first direction of the case;
the holder member has a holder notch that is notched toward one side in a second direction perpendicular to the first direction; and
the case notch and the holder notch overlap as viewed in the second direction, wherein
the elastic member includes an outer shape including two straight portions arranged in the second direction and two curved portions arranged in a third direction as viewed in the first direction, and a beam formed by at least two slits provided in a region surrounded by the outer shape.

2. The vibrating motor according to claim 1, wherein
the magnet member includes two magnets arranged in the first direction, and a magnetic body portion sandwiched by the magnets in the first direction, and magnetic poles of the magnets on a side facing the magnetic body portion are the same.

3. The vibrating motor according to claim 1, wherein:
the magnet member is a single member; the magnet member includes two magnetized regions arranged in the first direction, and a non-magnetized region sandwiched by the magnetized regions in the first direction; and
magnetic poles of the magnetized regions on a side facing the non-magnetized region are the same.

4. The vibrating motor according to claim 1, wherein
a width of the holder notch in a third direction perpendicular to the first direction and the second direction is the same as or shorter than a width of the case notch in the third direction.

5. The vibrating motor according to claim 1, wherein
both an inner end surface on the other side in the second direction of the holder notch and an inner end surface on one side in the first direction of the case notch are planes parallel to the second direction.

6. The vibrating motor according to claim 1, wherein
the elastic member has an elastic member notch notched toward one side in the second direction, and a width of the elastic member notch in a third direction perpendicular to the first direction and the second direction is the same as a width of the case notch in the third direction.

7. The vibrating motor according to claim 1, wherein
at least a part of the holder member is made of metal.

8. The vibrating motor according to claim 1, wherein
at least a part of the holder member is formed of a resin portion, and the elastic member is directly or indirectly fixed to the resin portion.

9. The vibrating motor according to claim 1 further comprising a lid and a buffer member disposed on one side in the first direction of the case, wherein
the elastic member is disposed between the movable element and the lid, and the buffer member is disposed on an inner surface of the lid facing one end surface in the first direction of the movable element.

10. The vibrating motor according to claim 1 further comprising a magnetic fluid disposed between an outer peripheral surface of the magnet member and an inner peripheral surface of the coil.

11. The vibrating motor according to claim 1 further comprising a cover member attached to an outer peripheral surface of the case and covering the case notch.

12. The vibrating motor according to claim 1, wherein
both the magnet member and the case have an outer peripheral surface including two flat surface portions arranged in the second direction and two curved surface portions arranged in a third direction and connecting the flat surface portions.

13. The vibrating motor according to claim 12, wherein
the flat surface portions of each of the magnet member and the case are parallel to the third direction perpendicular to the first direction and the second direction.

14. The vibrating motor according to claim 12 further comprising a circuit board, wherein the flat surface portions of the case are formed over an entire first direction of the case, and the circuit board is attached to one of the flat surface portions of the case.

15. The vibrating motor according to claim 14, wherein:
the circuit board has two terminals arranged in a region attached to the one of the flat surface portions of the case;
two lead wires of the coil are connected to corresponding ones of the terminals through the case notch; and
a distance in the first direction between one terminal and the case notch is different from a distance in the first direction between the other terminal and the case notch.

16. The vibrating motor according to claim 1 further comprising a lid disposed on one side in the first direction of the case, wherein
the elastic member is sandwiched between one end surface in the first direction of the case and the lid, and the lid has a recess recessed inward from an outer peripheral surface of the lid.

* * * * *